United States Patent [19]

Kutaragi

[11] 4,205,311
[45] May 27, 1980

[54] LIQUID CRYSTAL DISPLAY DEVICE
[75] Inventor: Ken Kutaragi, Yokohama, Japan
[73] Assignee: Sony Corporation, Tokyo, Japan
[21] Appl. No.: 941,312
[22] Filed: Sep. 11, 1978
[30] Foreign Application Priority Data Sep. 14, 1977 [JP] Japan .................................. 52-110881

[51] Int. Cl.² .............................................. G02F 1/13
[52] U.S. Cl. .................... 340/784; 340/765; 340/811; 350/332
[58] Field of Search ............... 340/765, 784; 350/331, 350/332

[56] References Cited

U.S. PATENT DOCUMENTS

| | | | |
|---|---|---|---|
| 3,653,745 | 4/1972 | Mao | 340/784 X |
| 3,750,140 | 7/1973 | Gray | 350/332 X |
| 3,781,864 | 12/1973 | Fujita | 340/765 |
| 3,781,865 | 12/1973 | Yamazaki | 350/332 X |
| 3,809,458 | 5/1974 | Henner et al. | 340/166 EL |
| 3,912,977 | 10/1975 | Fillmore | 350/332 X |
| 4,011,002 | 3/1977 | Ebihara et al. | 350/332 |
| 4,137,523 | 1/1979 | Mukaiyama | 350/332 X |

*Primary Examiner*—David L. Trafton
*Attorney, Agent, or Firm*—Hill, Van Santen, Steadman, Chiara & Simpson

[57] ABSTRACT

A liquid crystal display device having a liquid crystal display cell disposed between a first electrode and a second electrode is disclosed. A circuit for applying an exciting voltage to the first electrode is also provided. An integrator integrates the exciting voltage to produce a mean DC voltage. The mean DC voltage is applied to the second electrode. If necessary, an impedance converter is provided to convert the impedance of the output from the integrator so that it is lower than that of the liquid crystal cell.

8 Claims, 10 Drawing Figures

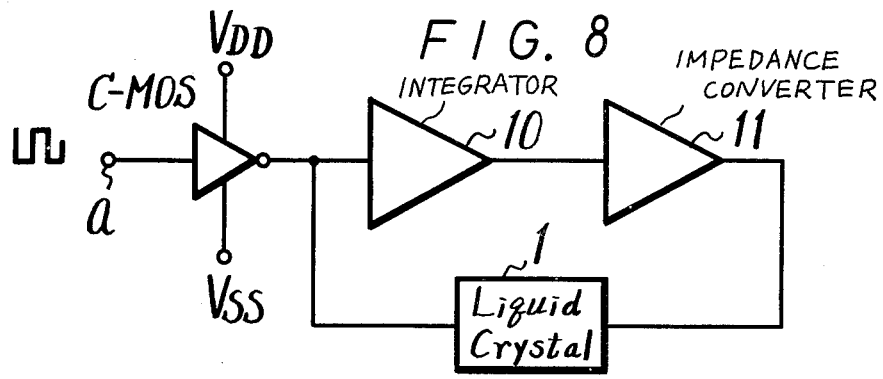

LIQUID CRYSTAL DISPLAY DEVICE

BACKGROUND OF THE INVENTION

1. Field of the Invention

The present invention relates generally to a liquid crystal display device, and is directed more particularly to a liquid crystal display device in which the life span of a liquid crystal display used therein can be greatly prolonged.

2. Description of the Prior Art

Since a liquid crystal display device consumes little electric power and can be driven by a low drive voltage, it is used as various display devices such as numerical display, letter display, bar graphical display, television video display, and so on.

It is known that if the liquid crystal is driven by a DC voltage, its life span is deteriorated or greatly shortened, so that in general the liquid crystal is driven by an AC voltage. In the latter case, if any DC voltage component remains across the liquid crystal, its life span becomes gradually shorter. Since the remaining or residual DC voltage component badly effects the life time span of the liquid crystal even if its value is in the order of mV (milli-volt), it is desired to suppress the residual DC voltage across the liquid crystal lower than 50 mV. In fact, even if the remaining DC component across the liquid crystal is relatively low, this remaining DC component is accumulated and then badly affects the liquid crystal.

In a prior art liquid crystal drive method, a liquid crystal cell is directly supplied at one of its opposing electrodes with a drive waveform from an AC drive source terminal and at its other electrode with the same through an exclusive OR gate circuit. With such a prior art method, the duty cycle of the drive waveform is deformed and hence a remaining DC component for the applied voltage is applied across the liquid crystal cell with the result that its life time span is deteriorated or becomes short. The above defect especially appears as the drive frequency becomes high.

In another prior art liquid crystal drive method, by means of a resistor division, the mid-point potential of the drive waveform is applied across a liquid crystal. In this case there may occur a DC offset due to the resistive error of the resistors and hence a DC component will remain across the liquid crystal.

It may be considered as another drive method for a liquid crystal that a non-polar capacity is provided so as to prevent a DC component from remaining. In this case, however, it is necessary to use a capacity and to provide a non-polar capacity for each of a plurality of liquid crystal cells (segments) which are arranged to be, for example, a figure "8" or a predetermined pattern in parallel relation so as to achieve various displays such as a numerical display, bar graphic display and so on. Therefore the construction becomes large, complicated and expensive. In this case, since the remaining DC component is consumed by a resistor, the electric power consumed by the whole device becomes great.

SUMMARY OF THE INVENTION

Accordingly, an object of the present invention is to provide a novel liquid crystal display device free from the defects inherent to the prior art devices.

Another object of the invention is to provide a liquid crystal display device in which a remaining DC component caused by voltage fluctuation of a drive waveform, offset, disturbance of the duty cycle, impedance variations of a driven circuit, and so on can be removed positively.

A further object of the invention is to provide a liquid crystal display device in which the life span of a liquid crystal used therein can be greatly prolonged.

With the present invention, in a liquid crystal display device having an integrator and a liquid crystal cell such as an electric field type liquid crystal, nematic liquid crystal or dynamic scattering type liquid crystal, a drive waveform from a driver circuit is applied to one of opposing electrodes of the liquid crystal cell which is supplied at its other electrode with a mean DC voltage which is produced in such a manner that the drive waveform is integrated by an integrator at a time constant lower than the fundamental frequency component in correspondence to the drive waveform.

According to an aspect of the present invention there is provided a liquid crystal display device which comprises a liquid crystal display cell interposed between a first group of electrodes and a second group of electrodes, a driver circuit for applying an exciting voltage to the first group of electrodes, and a circuit for applying a mean DC voltage obtained by integrating the exciting voltage to the second group of electrodes.

The other objects, features and advantages of the present invention will become apparent from the following description taken in conjunction with the accompanying drawings through which like elements are marked with the same reference numerals and symbols.

BRIEF DESCRIPTION OF THE DRAWINGS

FIGS. 8, 9 and 10, inclusive, are circuit diagrams showing drive circuits for a liquid crystal device according to the present invention.

DESCRIPTION OF THE PREFERRED EMBODIMENTS

Figure 1:
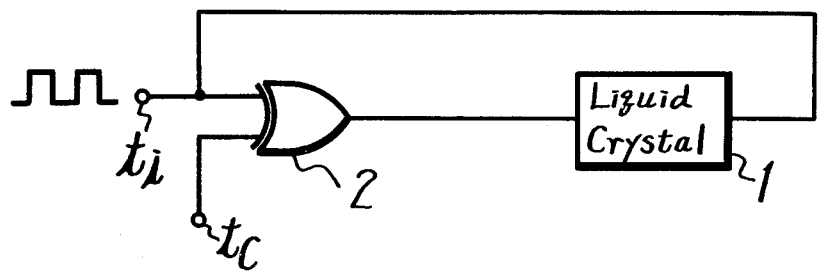
FIGS. 1 and 2 are circuit diagrams showing prior art drive circuits for a liquid crystal display device, respectively.

For better understanding of the present invention, an example of the prior art method of driving a liquid crystal cell used in a liquid crystal display device will be now described with reference to FIG. 1. In FIG. 1, 1 designates a liquid crystal cell which is supplied at one of its opposing electrodes with a drive waveform from an AC drive source terminal $t_1$ directly and at its other terminal with the drive waveform through an exclusive OR gate circuit 2. In this case, when the OR gate circuit 2 is supplied at its control terminal $t_c$ with a signal "1", both ends, i.e. opposing electrodes of the liquid crystal cell 1, are supplied with the waveform which is applied to the exclusive OR gate circuit 2, one of the waveforms being of inverse phase with respect to the other. As a result, the liquid crystal cell 1 is supplied with a voltage two times the applied waveform and hence turns ON. When a signal "0" is applied to the OR gate circuit 2 at its control terminal $t_c$, the waveforms of the same phase are applied across the cell 1. Thus, at this time the cell 1 turns OFF.

With the above prior art drive method, when the duty cycle of the drive waveforms is 50:50, no DC component appears when the cell 1 is in an ON-state. However, when the duty cycle is disturbed or becomes, for example, 49:51, a residual DC component of 2% of the applied voltage is applied across the cell 2. When the cell 1 is driven through a driver circuit such as a C-MOS transistor, the unbalance of duty cycle due to the above order of delay is caused frequently. Thus, the liquid crystal cell cannot be used for a long time by the above prior art drive method. If the drive frequency is made high, the above tendency appears. For example, if the duty is 49:51 and the applied voltage is 5 V, the residual DC component becomes 100 mV.

Next, the prior art drive circuit will be described. In general, the liquid crystal cell 1 is driven through a C-MOS transistor in the art as shown in FIG. 2, In the figure, reference letters $TR_1$ and $TR_2$ designate a P-channel MOS-FET and an N-channel MOS-FET which form the driver circuit or the C-MOS transistor.

Figure 3:
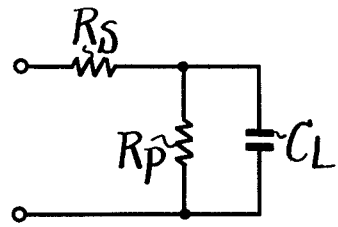
FIG. 3 is an equivalent circuit of a liquid crystal cell.

FIG. 3 is an equivalent circuit of the liquid crystal 1, in which a resistor $R_s$ is about several K$\Omega$ in resistance value, a resistor $R_P$ is about 1 T$\Omega$ (tera-ohm), and a capacitor $C_L$ is about several hundreds PF/cm$^2$ in capacity, respectively.

Figure 2:
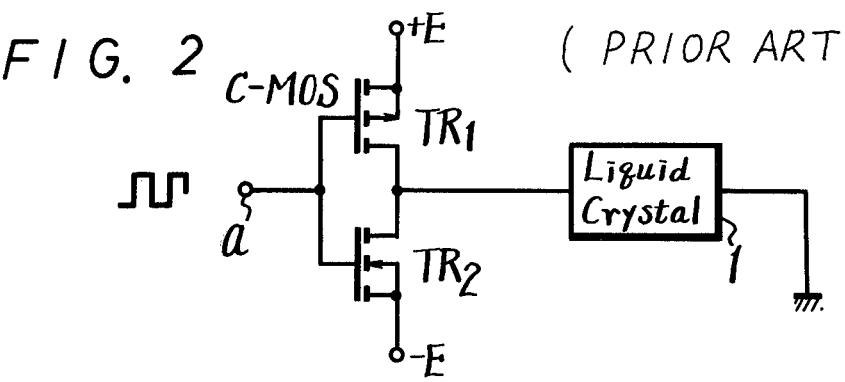
Figure 4:
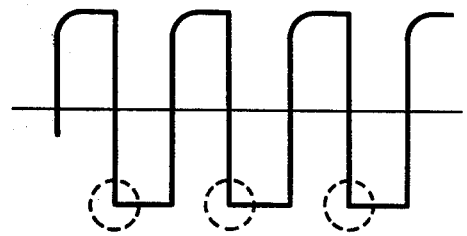
FIG. 4 is a waveform diagram of a prior art drive signal for a liquid crystal cell.

Turning back to the drive circuit of FIG. 2, when the two MOS-FETs $TR_1$ and $TR_2$ are equal in impedance during the ON-state thereof, impedances viewed from the load systems to $+E$ and $-E$ terminals become equal. Under such a condition, when a rectangular waveform having the duty of 50:50 is applied to an input terminal a of the C-MOS transistor, the output waveform therefrom becomes symmetrical with respect to the potential $$\frac{(+E) + (-E)}{2} = 0$$

regardless of the load impedance and hence no residual DC component remains. However, if there is error in the impedances of the MOS-FETs $TR_1$ and $TR_2$, the output from the C-MOS transistor is offset either positively negatively and hence there remains a residual DC component. Since the liquid crystal 1 is expressed equivalently as shown in FIG. 3 and becomes almost completely a capacity load, the liquid crystal 1 is now taken as a load. If the MOS-FETs $TR_1$ and $TR_2$ are different in impedance, for example, the impedance of the MOS-FET $TR_1$ is higher than that of the MOS-FET $TR_2$, the waveform which is applied to the liquid crystal 1 becomes rounded off at its shoulders at the positive side as shown in FIG. 4. On the contrary, when the impedance of the MOS-FET $TR_2$ is higher than that of the other MOS-FET $TR_1$, the shoulders of the applied waveform at the negative side, which are marked with dotted line circles in FIG. 4, becomes rounded off. That is, when the impedances of the MOS-FETs $TR_1$ and $TR_2$ are unbalanced, a mean DC voltage does not become zero and hence there remains a residual DC component.

In general, a C-MOS transistor which is formed such that both conductivity types or N- and P-type MOS-FETs $TR_1$ and $TR_2$ are integrated on a common semiconductor substrate, both the MOS-FETs $TR_1$ and $TR_2$ of the both conductivity types cannot have uniform characteristics in impurity concentration and area in view of their manufacturing point and hence error appears in their impedance. As a result, when the C-MOS transistor is used as the driver circuit for the liquid crystal, the residual DC component remains across the liquid crystal without exception and hence its life time span is deteriorated or shortened.

Figure 5:
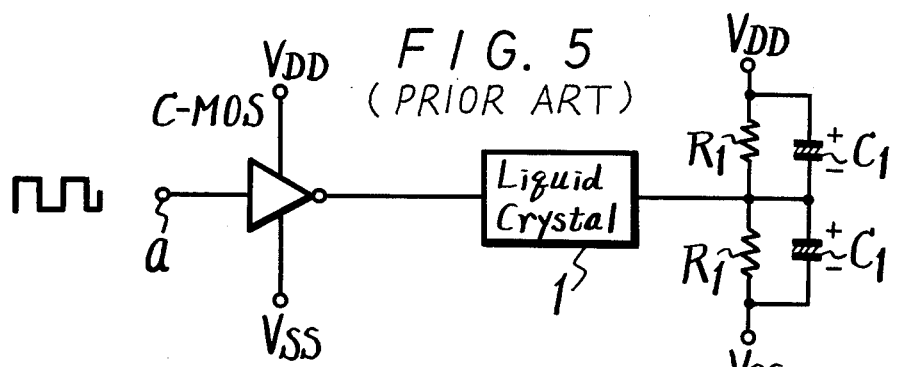
FIGS. 5, 6 and 7, inclusive, are circuit diagrams showing prior art drive circuits for a liquid crystal display device, respectively.

FIG. 5 is another example of the prior art drive method for the liquid crystal 1. In this prior art, the mid-point potential of the drive waveform, which is provided by a divider consisting of two resistors $R_1$, is applied to the liquid crystal 1. In this case, there may be a fear that a DC offset is caused by the error of the resistance value of the resistors $R_1$. Therefore, even if the resistors $R_1$ having an accuracy of 1% are used, a DC component of 50 mV remains when the drive voltage is selected as 5 V. In FIG. 5, $C_1$ represents capacitors for by-passing an AC component.

Figure 6:
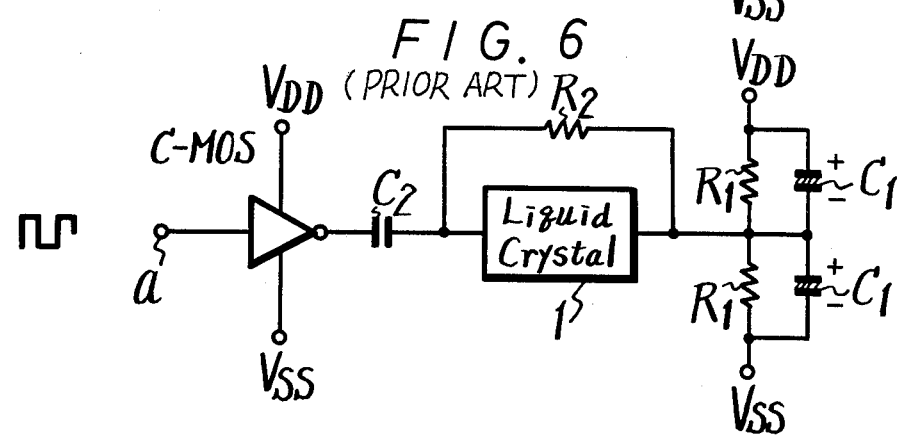

A further example of the prior art drive circuit is shown in FIG. 6. As shown in FIG. 6, a non-polar capacity $C_2$ is provided in the circuit shown in FIG. 5 for blocking the DC component. In this case, it is necessary to use a capacitor having a large capacity, for example, 0.1 to 1 $\mu$F as the non-polar capacitor $C_2$. In FIG. 6, $R_2$ represents a resistor connected in parallel to the liquid crystal 1 through which resistor $R_2$, the DC component, flows.

Figure 7:
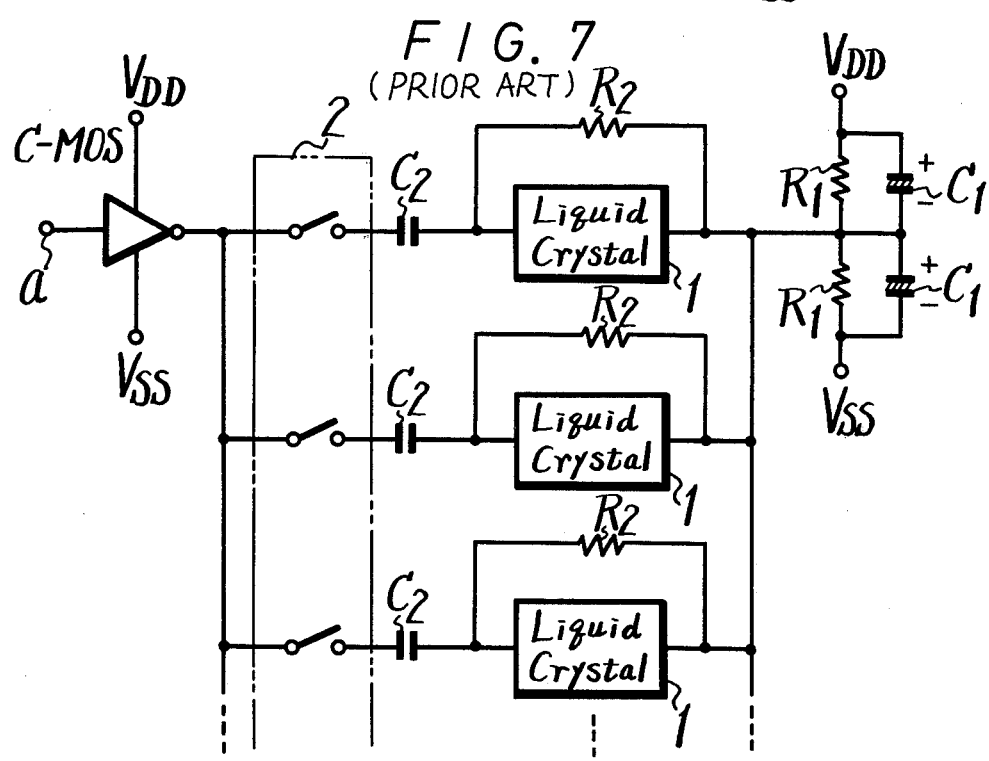

FIG. 7 shows a still further example of the prior art drive circuit. In a display device which will achieve various displays such as a numerical display and so on, a plurality of liquid crystal cells (segments) 1 are arranged with a predetermined pattern such as a figure "8" or parallel arrangement, so that it is necessary to provide the capacitor $C_2$ for each of the plurality of liquid crystal cells 1 as shown in FIG. 7 and hence the display device becomes complicated and large in size. In this case, since the residual DC component is consumed by the resistors $R_2$, the power consumption of the whole device increases. In FIG. 7, 2 generally indicates an electrical or mechanical switch which is controlled by a display signal from the driver circuit to select the liquid crystal cells 1 in response to the display signal and to apply therethrough the drive voltage signal to the selected liquid crystals 1.

As described previously, the present invention is to provide a liquid crystal display device which is free from the defects of the prior art, can positively remove a residual DC component produced by the voltage fluctuation of the drive waveform from the drive circuit, offset, the disturbance of the duty cycle of the drive waveform, the impedance change of the driver circuit and so on, and hence can prolong the life time of the liquid crystal cell.

An example of the present invention will be now described with reference to FIG. 8 in which reference numerals and symbols are the same as those used in FIGS. 1 to 7, and designate the same elements and their detailed description will be omitted. In this example of the invention, for example, the drive waveform from a driver circuit having the C-MOS transistor is applied to one of the opposing electrodes of the liquid crystal cell 1 such as an electric field type liquid crystal, nematic liquid crystal, or dynamic scattering type liquid crystal. A mean DC voltage, which is provided by integrating the drive waveform from the C-MOS transistor with an integrator 10 at the time constant lower than the fundamental frequency component of the drive waveform and hence corresponds to the drive waveform, is applied to the other electrode of the liquid crystal cell 1. In this case, if the impedance of the output from the integrator 10 is too high as is, it is possible that the output from the integrator 10 is applied to an impedance converter 11 for lowering impedance and then the output from the impedance converter 11 is applied to the liquid crystal 1.

A practical circuit of the example shown in FIG. 8 will be described with reference to FIG. 9. In the circuit of FIG. 9, the integrator 10 is formed of a resistor R having the resistance value of, for example, 1 MΩ and a capacitor C having the capacity of, for example, 0.1 μF and the impedance converter 11 is formed of a voltage follower operational amplifier. In this example, since the offset of the voltage follower operational amplifier serving as the impedance converter 11 is sufficiently small, it poses almost no problem. However, if the constant of the integrator 10 is selected suitably and/or the drive frequency is high, the impedance converter 11 can be omitted. For example, if the frequency of the fundamental wave of the drive waveform is selected as 100 $H_z$ and the capacity of the integrating capacitor C is selected as 1 μF, the impedance of the output from the integrator 10 becomes about 1.6 KΩ. This impedance is sufficiently small as compared with that of the liquid crystal cell 1, so that in this case the integrated output can be applied to the liquid crystal cell 1 without being impedance-converted.

FIG. 10 shows such an example that the present invention applied to a liquid crystal display device in which a plurality of liquid crystal cells 1 are arranged in the figure "8" or parallel and the plurality of cells 1 are selectively driven by the display signal from the driver having the C-MOS transistor through the electrical or mechanical switch 2 which is controlled by the display signal. As shown in FIG. 10, it is enough that the single integrator 10 and, if necessary, impedance converter 11 are commonly connected to the plurality of liquid crystal cells 1, so that even if a display device includes a number of liquid crystal cells 1, the number of the circuit elements is prevented from being increased and hence the device is prevented from becoming large in size and expensive. Further, the liquid crystal can be free from affects such as the unbalances of the duty cycle and the impedance of the output driver circuit, the scattering and fluctuation of the power source and so on, and the residual DC component can be reduced or removed, so that the life span of the liquid crystal can be prolonged. The present invention is especially useful when applied to the case where the liquid crystal is driven by a high voltage and high frequency.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A liquid crystal display device comprising:
   (a) a liquid crystal display cell interposed between first electrode means and second electrode means;
   (b) exciting means applied to said first electrode means for obtaining an exciting voltage; and
   (c) integrating means applied to said second electrode means for obtaining a substantially mean DC voltage by integrating said exciting voltage.

2. A liquid crystal display device as claimed in claim 1, wherein an impedance converter means is connected in series between said integrating means for obtaining a mean DC voltage and said second electrode means, said impedance converter means converting an impedance of an output of said integrating means lower than an impedance of said liquid crystal cell.

3. A liquid crystal display device as claimed in claim 2 wherein said impedance converter means is a voltage follower operational amplifier.

4. A liquid crystal display device as claimed in claim 1 wherein said exciting means comprises an exciting driver circuit having a C-MOS transistor.

5. A liquid crystal display device as claimed in claim 1, wherein said integrating means is an integrator circuit.

6. A liquid crystal display device comprising:
   (a) a plurality of series circuits each formed of a liquid crystal cell and a switch, each switch being controlled by a display signal voltage, and the series circuits being connected in parallel;
   (b) an integrator means connected in parallel with the parallel connected series circuit;
   (c) exciting means for applying an exciting voltage to one end of the parallel connected series circuits; and
   (d) said integrating means applying a mean DC voltage obtained by integrating said exciting voltage to the other end of the parallel connected series circuits.

7. A liquid crystal display device as claimed in claim 6, wherein an impedance converter means is connected in series with an output side of said integrating means, said impedance converting means converting an impedance at the output side of the integrating means lower than an impedance of the liquid crystal cell.

8. A liquid crystal display device comprising:
   (a) a liquid crystal cell having first and second terminals;
   (b) exciting means for providing an AC drive signal of a given fundamental frequency to the crystal cell first terminal; and
   (c) an integrating means coupled to the exciting means and having a time constant lower than the fundamental frequency of the drive signal and which provides an average DC, an output of the integrating means being coupled to the crystal cell second terminal.

* * * * *